United States Patent [19]
Korpi et al.

[11] Patent Number: 5,967,190
[45] Date of Patent: Oct. 19, 1999

[54] TAIL PIPE PROTECTOR

[75] Inventors: John G. Korpi, Livonia, Wayne County; Kenneth A. Greene, Commerce Township, Oakland County; Diane M. McCarthy, Sterling Heights, Macomb County; Alexander M. Sneddon, Harrison Township, Macomb County; Nicholas LoGreco, Macomb County, all of Mich.

[73] Assignee: The United States of America as represented by the Secretary of the Army, Washington, D.C.

[21] Appl. No.: 09/061,844

[22] Filed: Mar. 16, 1998

[51] Int. Cl.⁶ ...................................................... F16L 57/00
[52] U.S. Cl. ........................ 138/96 R; 138/109; 138/110
[58] Field of Search .................................. 138/96 R, 110, 138/109; 405/40, 41, 127; 239/288, 288.3; 180/287, 271, 309; 48/192; 454/2

[56] References Cited

U.S. PATENT DOCUMENTS

| 805,579 | 11/1905 | Patchen | 138/110 |
|---|---|---|---|
| 1,002,752 | 9/1911 | Rand | 239/288.3 |
| 1,693,459 | 11/1928 | Paulus et al. | 138/110 |
| 2,172,130 | 9/1939 | Powell | 138/110 |
| 3,587,239 | 6/1971 | Feland | 138/96 R |
| 4,230,346 | 10/1980 | Göbel | 138/109 |
| 4,601,334 | 7/1986 | Lovegrove | 138/110 |
| 4,782,863 | 11/1988 | Lavalerie et al. | 138/89 |
| 5,102,537 | 4/1992 | Jones | 138/96 R |

*Primary Examiner*—James F. Hook
*Attorney, Agent, or Firm*—Peter A. Taucher; Gail S. Soderling

[57] ABSTRACT

A tail pipe protector for military vehicles is formed with a plurality of legs shaped and joined to form a structure with free ends on the legs that will adapt to the various types of tail pipes. The structure is clamped in position to hold the protector in place and the clamping results in the structure being rigidified by the same action.

1 Claim, 2 Drawing Sheets

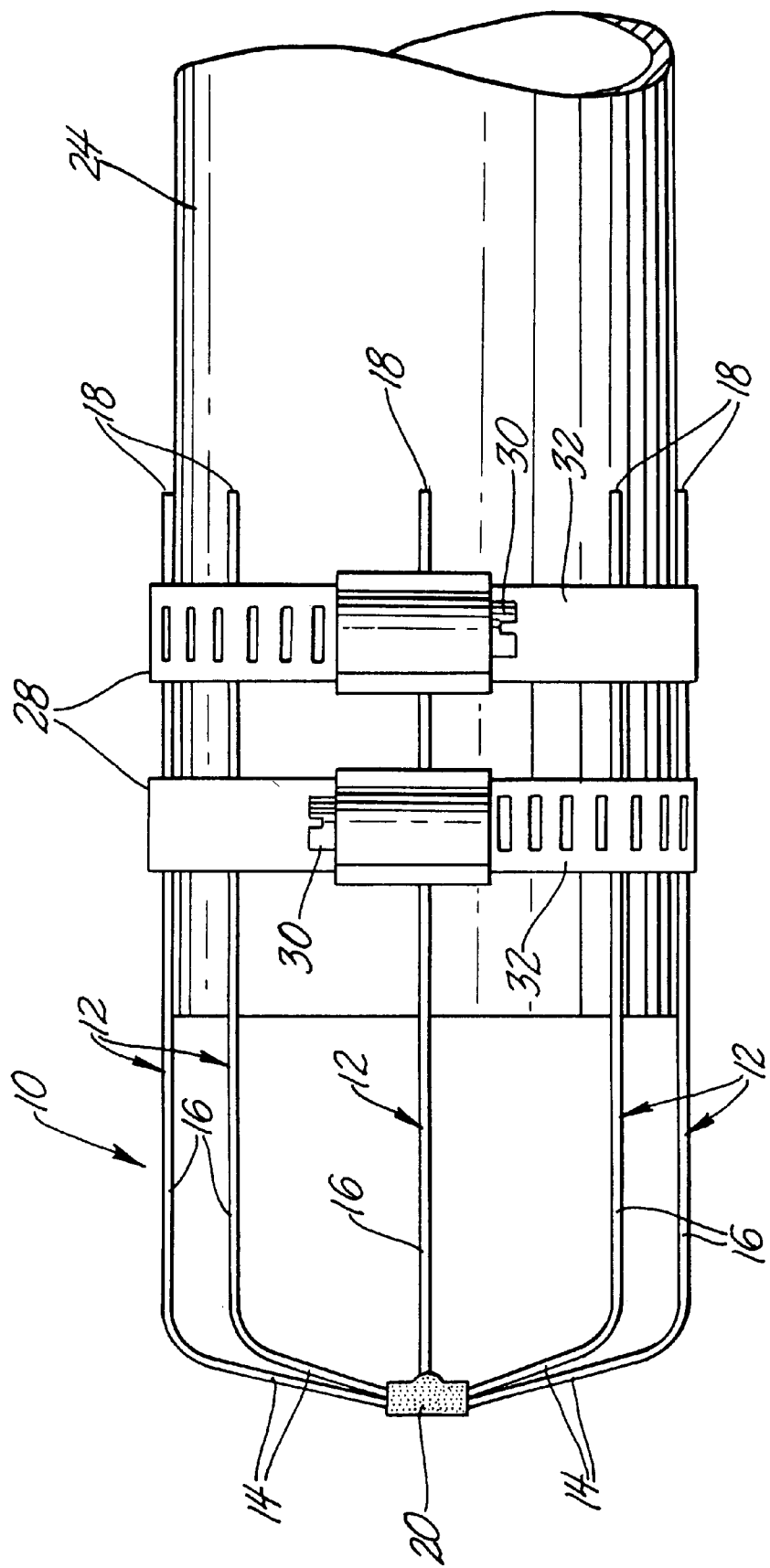

TAIL PIPE PROTECTOR

GOVERNMENT INTEREST

The invention described here may be made, used and licensed by for governmental purposes without paying us any royalty.

BACKGROUND OF THE INVENTION

1. Field of the Invention

In one aspect this invention relates to anti-sabotage devices. In a further aspect this invention relates to a device to prevent the insertion of a blocking member into the tail pipe of a military vehicle.

2. Prior Art

In general, commercial vehicles are not exposed to the hazards of sabotage by having the exhaust systems intentionally blocked. If there is an intentional or unintentional blockage, the system failure will cause an inconvenience but would not represent a clear and present danger. The situation for military vehicles is markedly different where a vehicle being rendered even temporarily inactive can have fatal consequences. Situations where military vehicles are being sabotaged have become increasingly frequent as military forces have assumed long term caretaker roles requiring the forces to occupy fixed positions in hostile foreign countries for extended periods of time. In such positions there exist numerous opportunities for civilian and paramilitary individuals to pass in close proximity to a vehicle with the intent to disable the vehicle for a short period of time in order to prevent the rapid deployment of the vehicle to the site of a disturbance or the escape of the force if subjected to hostile actions. Even a short hiatus in availability of the vehicle can expose the users to danger or prevent their being available for duty.

A military force generally uses a large number of different vehicles having markedly different tail pipe characteristics in diameter, shape and configuration with a variety of possible curves to be accommodated. It would be desirable to have a tail pipe protective device that could be used on any of the various military vehicles likely to be used in a policing action. Such a device would have a structure that prevents insertion of a blocking device or substance into the exhaust outlet of a tail pipe. This requires that at least a portion of the device be located at a distance from the terminus of the exhaust outlet. Further, the portion of the device attached to the tail pipe assembly must be easily deformed so as to conform to the outer surface of the particular tail pipe closely enough to be firmly clamped into engagement with the tail pipe to prevent the device from being disengaged.

SUMMARY OF THE INVENTION

Briefly the present invention is a quick install tail pipe protector for use in deterring sabotage of a military vehicle. The protector prevents the insertion of a blockage substance into the tail pipe. The protector of the present invention has a multiplicity of L-shaped rods each rod having a relatively shorter first leg with a free end and a relatively longer second leg with a cantilevered free end. The free ends of the shorter legs are rigidly joined at a common point to consolidate the free ends of the shorter legs. The shorter legs are consolidated so they extend radially outward from the point of joining and lie in a common plane. The longer legs of the L-shaped rods are joined to the shorter legs at approximately right angles. When the shorter legs of the L-shaped rods are joined in the practice of this invention, the longer legs will extend substantially parallel to each other and will all lie on one side of the common plane formed by the shorter legs. The free ends of the longer legs will be disposed so they lie in a second plane distal the common plane. The free ends of the longer legs are cantilevered with respect to the common plane formed at the angle in the L-shaped rods. The resulting structure forms a barrier structure, which can be placed over the external surface of the tail pipe.

To install the tail pipe protector, the barrier structure is placed with the cantilevered free ends of the structure surrounding the tail pipe with the common plane containing the short legs located at a distance from the end of the tailpipe. A clamping means, adapted to surround and compress the cantilevered ends of the long arms into contact with the tail pipe, is placed over the free ends and closed so as to force the free ends into contact with the outer surface of the tailpipe. This securely compresses the legs against the tailpipe and holds the tailpipe protector securely on the vehicle to be protected.

BRIEF DESCRIPTION OF THE DRAWING

In the accompanying drawing:

FIG. 3 is a side view of the structure of FIG. 1 installed on the end of a tail pipe.

DETAILED DESCRIPTION

Figure 1:
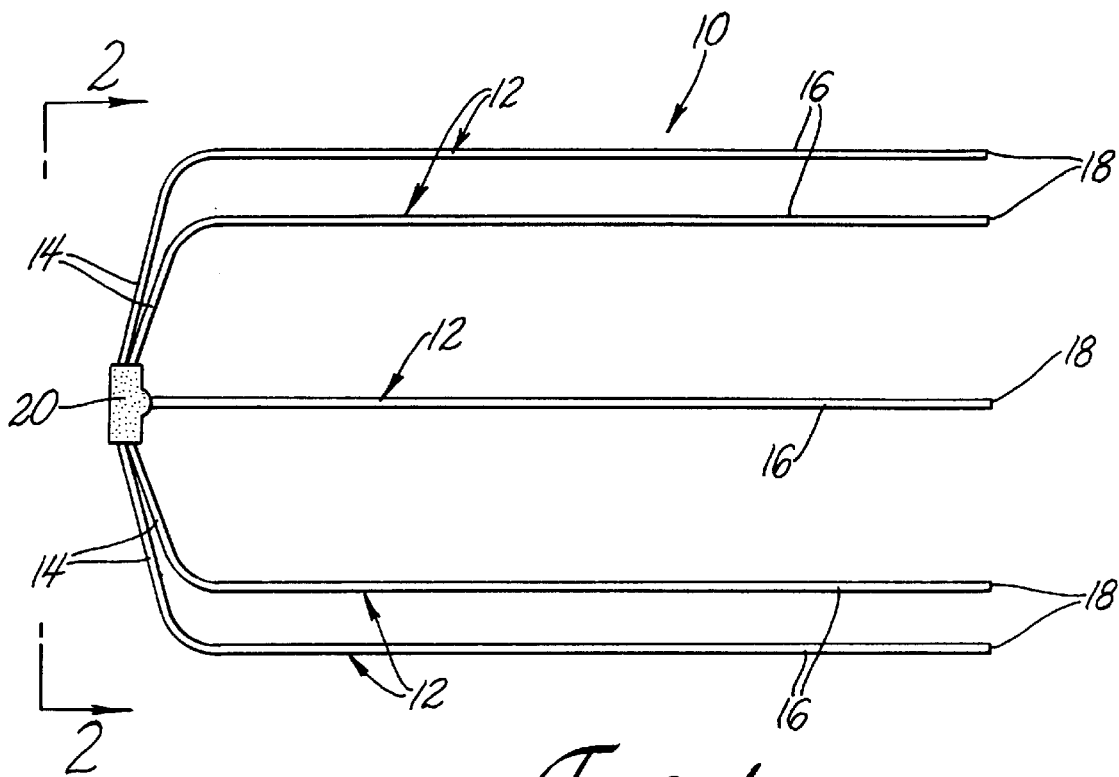
FIG. 1 is a side view of one embodiment of this invention.
Figure 2:
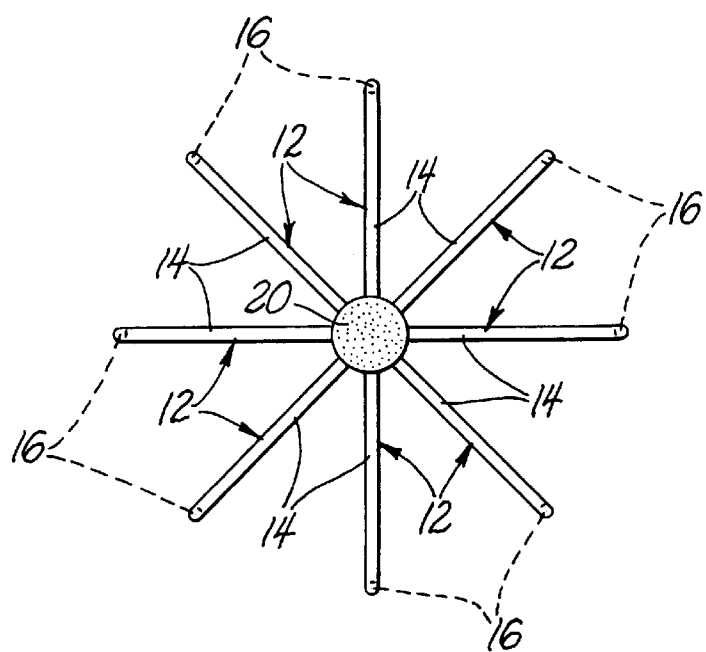
FIG. 2 is an end view of the structure of FIG. 1.

Referring to the accompanying drawing in which like numerals refer to like parts and initially to FIG. 1, a tail pipe protector 10 of the present invention is formed from a multiplicity of L-shaped rods 12. Each rod 12 has a relatively shorter first leg 14 and a relatively longer second leg 16, the longer legs having a cantilevered free end 18. The ends of the shorter legs 14 opposite the longer legs 16 are rigidly joined at a common point 20 to consolidate the ends of the shorter legs and form a consolidated structure. This common point 20 is shown as a weldment although it could be a brazed or soldered joint. The joint of common point 20 can also be made by using mechanical clamping or fastening devices. The shorter legs 14 are consolidated so the individual legs extend radially outward from the common point 20 in an evenly spaced pattern similar to the spokes of a wheel as shown best in FIG. 2. The radially extending shorter legs 14 lie substantially in a common plane.

The longer legs 16 of the L-shaped rods 12 are joined to the shorter legs at approximately right angles and extend substantially parallel to each other. The longer legs 16 lie coaxially with respect to a longitudinal axis of the protector 10 and will all lie on one side of the common plane formed by the shorter legs 14. The free ends 18 of the longer legs 16 will be disposed so they end in a second plane distal the common plane. The free ends 18 of the longer legs 16 are suspended in a cantilever fashion from shorter legs 14 with respect to the common plane at the angle where the shorter and longer legs are joined.

The resulting protector 10 can be installed as a barrier by placing it over the external surface of a tail pipe 24 as shown in FIG. 3. To install the tail pipe protector 10, the structure is placed with the free ends 18 of the flexible, cantilevered longer legs 16 surrounding the tail pipe 24 with the common plane defined by the shorter legs 14 located at a distance from the end of the tailpipe. The common plane defined by the shorter legs 14 should be removed from the tail pipe sufficiently to prevent a clump of mud or other substance from being easily forced or inserted into the tail pipe. In general, it is thought that the common plane should be located about 2 inches from the end of the tail pipe in order to prevent the insertion of obstructive objects. Similarly, the spacing between the legs used to form the structure should be spaced about 0.25 to 2.0 inches preferably 0.5 to 1.5 inches apart. The minimum spacing between the legs should be large enough to represent no impediment to exhaust, which would create an undesirable backpressure. The maximum spacing prevents larger objects from being inserted into the structure and thence the tail pipe. Spacing below about 0.25 in would create manufacturing problems and would create a structure which itself would serve as the support for a substance to block the exhaust pipe. Separations greater than 2 inches would allow the insertion of fairly large objects into the protector 10 defeating its purpose.

As shown in FIG. 3, a pair of clamping means 28, shown as well known hose clamps, are placed to surround and compress the cantilevered ends 18 of the flexible long arms 16 into contact with the outer surface of tail pipe 24. Rotating the screw 30 engaging the apertures in the band 32 tightens the clamping means. Because the free ends 18 are cantilevered and the longer legs 16 of the arms are flexible, the clamp 28 need to exert only a small force to collapse the free ends into engagement with the tailpipe 24. However, once the free ends 18 are firmly clamped, they will have substantially increased stiffness that increases the difficulty of inserting objects between the legs and into the exhaust pipe.

Various alterations and modifications will become apparent to those skilled in the art without departing from the scope and spirit of this invention and it is understood this invention is limited only by the following claims.

What is claimed is:

1. A quick install tail pipe protector for use in deterring sabotage of a military vehicle exhaust system by preventing the insertion of a blockage means into the exhaust pipe including:

a multiplicity of L-shaped rods each rod having a relatively shorter first leg with a free end and a relatively longer second leg, the free ends of the shorter legs being rigidly joined at a common point with the shorter legs extending radially outward from the point of joining and lying in a common plane, the longer legs of the L-shaped rods extending substantially parallel to each other, all of said longer legs lying on one side of the common plane formed by the shorter legs of the L-shaped rods, the longer legs having their free ends disposed in a second plane distal the common plane the free ends of the longer legs being cantilevered with respect to the common plane; and a clamping means, the clamping means being adapted to surround and compress the cantilevered ends of the long arms into contact with the exhaust pipe to securely hold the legs on the tail pipe to be protected the long arms being spaced about 0.25 to 2.0 inches apart.

* * * * *